(12) United States Patent
Carter

(10) Patent No.: US 9,614,872 B2
(45) Date of Patent: Apr. 4, 2017

(54) SYSTEMS AND/OR METHODS FOR MANAGING CRITICAL DIGITAL ASSETS IN POWER GENERATING PLANTS

(75) Inventor: Kevin C. Carter, Wilsonville, OR (US)

(73) Assignee: SHEFFIELD SCIENTIFIC, Houston, TX (US)

( * ) Notice: Subject to any disclaimer, the term of this patent is extended or adjusted under 35 U.S.C. 154(b) by 0 days.

(21) Appl. No.: 13/979,093

(22) PCT Filed: Jan. 10, 2012

(86) PCT No.: PCT/US2012/020760
§ 371 (c)(1),
(2), (4) Date: Dec. 19, 2013

(87) PCT Pub. No.: WO2012/096947
PCT Pub. Date: Jul. 19, 2012

(65) Prior Publication Data
US 2014/0304772 A1    Oct. 9, 2014

Related U.S. Application Data

(60) Provisional application No. 61/431,260, filed on Jan. 10, 2011.

(51) Int. Cl.
*H04L 29/06* (2006.01)
*F01K 13/02* (2006.01)
(52) U.S. Cl.
CPC .............. *H04L 63/20* (2013.01); *F01K 13/02* (2013.01)
(58) Field of Classification Search
CPC ................................ H04L 63/08; H04L 63/20
USPC ........................................................... 726/3
See application file for complete search history.

(56) References Cited

U.S. PATENT DOCUMENTS

| | | | | |
|---|---|---|---|---|
| 7,536,548 | B1* | 5/2009 | Batke | H04L 63/061 713/166 |
| 7,721,321 | B2* | 5/2010 | Risley | 726/1 |
| 7,760,650 | B2* | 7/2010 | Reshef | G05B 19/4183 370/241 |
| 8,874,242 | B2* | 10/2014 | Smith | G06Q 10/067 700/17 |
| 9,063,639 | B2* | 6/2015 | Grewal | G05B 19/05 |
| 2003/0023518 | A1* | 1/2003 | Spriggs | G05B 15/02 705/28 |
| 2005/0005093 | A1 | 1/2005 | Bartels et al. | |
| 2007/0199061 | A1* | 8/2007 | Byres et al. | 726/11 |
| 2008/0167931 | A1* | 7/2008 | Gerstemeier | G06Q 10/06 705/7.22 |
| 2009/0187579 | A1 | 7/2009 | Brancaccio et al. | |

(Continued)

FOREIGN PATENT DOCUMENTS

WO    WO 02/13113 A2    2/2012

OTHER PUBLICATIONS

International Search Report and Written Opinion dated May 17, 2012 for International Application No. PCT/US2012/020760 (11 pages).

(Continued)

*Primary Examiner* — Mahfuzur Rahman
(74) *Attorney, Agent, or Firm* — Sage Patent Group

(57) ABSTRACT

Systems and methods are disclosed that implement a coordinated cyber security program for a power generation plant to establish and/or maintain cyber security controls for the power generation plant through a comprehensive life cycle approach.

12 Claims, 5 Drawing Sheets

(56) References Cited

U.S. PATENT DOCUMENTS

2010/0115601 A1    5/2010  Brandstetter et al.
2010/0138066 A1    6/2010  Kong
2012/0151558 A1*  6/2012  Byres et al. ...................... 726/3

OTHER PUBLICATIONS

International Preliminary Report on Patentability dated Feb. 25, 2014 for International Application No. PCT/US2012/020760 (9 pages).

* cited by examiner

SYSTEMS AND/OR METHODS FOR MANAGING CRITICAL DIGITAL ASSETS IN POWER GENERATING PLANTS

CLAIM OF PRIORITY

The present application claims the benefit of and priority to U.S. Provisional Patent Application No. 61/431,260, filed Jan. 10, 2011, entitled "SYSTEMS AND/OR METHODS FOR MANAGING CRITICAL DIGITAL ASSETS IN POWER GENERATING PLANTS," the disclosure of which is hereby incorporated herein by reference in its entirety.

FIELD

The present invention relates to power generating plants, and in particular to the management of critical digital assets in power generating plants.

BACKGROUND

Recently, there has been a resurgence of interest in electric power generation using nuclear power as an alternative to fossil fuel-based electric power generation. In the United States, this resurgence of interest has been facilitated in part by the Nuclear Power 2010 Program established in 2002. The Nuclear Power 2010 Program is a joint government/industry effort to identify sites for new nuclear power plants and to develop and bring to market advanced nuclear plant technologies. The Nuclear Power 2010 Program was instituted by the Nuclear Regulatory Commission (NRC), which regulates the nuclear power industry in the United States and licenses the operation of nuclear facilities. Operators of nuclear facilities are therefore often referred to as "licensees."

Currently, there are just over 100 commercial nuclear power plants operating in the United States, producing a total of about 800 TWh of electricity per year. Commercial nuclear power plants in the United States are so-called "light water reactors," which are nuclear reactors that use ordinary water as a coolant and neutron moderator, as opposed to heavy water (deuterium oxide) reactors that are more common outside the United States.

About two-thirds of the commercial nuclear power plants in the United States are pressurized water reactors (PWR), while the remaining one third are earlier-generation boiling water reactors (BWR). In a BWR, water in the primary coolant loop (i.e. water that is pumped into the reactor core) boils to form steam that is used to power a generator. In contrast, in a PWR, pressurized water is used in the primary coolant loop, which prevents the water from boiling. Heat exchangers allow the heated water in the primary coolant loop to heat water in a secondary coolant loop that boils to form steam that is used to power the generator. Accordingly, many commercial nuclear power plants operating in the United States have designs that are at least somewhat similar to other commercial nuclear power plants in the United States.

One reason interest in nuclear power has increased is that, unlike coal-fired electric power plants and other fossil fuel based power plants, nuclear power plants may not emit harmful substances, such as carbon compounds, sulphur oxides, heavy metals, fly ash, and other such materials into the atmosphere as a by-product of normal operation. Moreover, nuclear power plants may be more cost-effective and efficient, and maybe capable of generating considerably more power than other "green" energy technologies, such as solar and wind-based electric power generators.

However, nuclear power plants have a drawback in that they require radioactive materials to operate. To mitigate the chance of accidental release of radioactive materials, nuclear power plants are designed to keep the radioactive materials within closed-circuit systems, with multiple redundant systems designed to reduce the possibility of accidental release.

Because of the presence of radioactive materials at a nuclear power plant, the physical security of such sites has long been a priority for both nuclear power plant operators and regulators. Nuclear power plants are designed to withstand man-made perils, such as airplane accidents, as well as natural disasters, such as hurricanes, tornadoes and earthquakes. Nuclear terrorism is of particular concern to both government and industry, due to the concern over a radioactive release at the power plant site itself, and the concern that radioactive materials could be removed and released at a more heavily populated location or, in a worst case scenario, used as a component in a weapon.

Recently, there has been an increase in the concern over not just the physical security of nuclear power plants, but also in their security against computer-based threats. Indeed, in 2010, the Stuxnet computer worm was identified as a specific computer-based threat to nuclear power plants. The Stuxnet worm is a form of computer virus that spies on and reprograms industrial systems. It was reportedly specifically written to attack Supervisory Control And Data Acquisition (SCADA) systems used to control and monitor industrial processes, and was confirmed to have affected at least one nuclear power plant outside the United States.

In the United States, the NRC has already directed nuclear power plant operators, or licensees, to develop and implement a plan for the protection of digital computer and communication systems used in nuclear power plants. In particular, the NRC has promulgated Title 10, Part 73, of the Code of Federal Regulations, entitled "Physical Protection of Plants and Materials." Section 73.54 of the Code of Federal Regulations, entitled "Protection of Digital Computer and Communication Systems and Networks," requires that licensees provide high assurance that digital computer and communication systems and networks are adequately protected against cyber attacks, up to and including the threats described in 10 CFR Part 73, Section 73.1, which are used to design safeguards systems to protect against acts of radiological sabotage and to prevent the theft or diversion of nuclear material (referred to as the Design Basis Threats (DBT)).

In particular, nuclear power plant operators are required to protect certain digital computer and communications systems and networks in nuclear power plants from those cyber attacks that would modify, destroy, or compromise the integrity or confidentiality of data and/or software, deny access to systems, services, and/or data, and/or impact the operation of systems, networks, and associated equipment. In particular, the operators are required to protect digital computer and communications systems and networks that perform safety-related and important-to safety functions, security functions, emergency preparedness functions, including offsite communications, and support systems and equipment which, if compromised, would adversely impact safety, security, or emergency preparedness functions. These functions are referred to collectively as the "SSEP functions."

The applicable regulations also require that each licensed nuclear power plant operator submit a cyber security plan for Nuclear Regulatory Commission review and approval.

Current applicants for an operating license or combined license must submit a cyber security plan. The cyber security plan must establish a means to achieve high assurance that certain digital computer and communication systems and networks associated with SSEP functions are adequately protected against cyber attacks up to and including the Design Basis Threats (DBT). In particular, digital computer and communication systems and networks associated with SSEP functions that are identified as Critical Digital Assets (CDAs) must be protected against threats identified as design basis threats.

The Nuclear Energy Institute (NEI) is a policy organization that operates on behalf of the nuclear power industry. The NEI was formed, in part, to encourage the safe utilization and development of nuclear energy, and to support the nuclear energy industry by providing a unified nuclear energy industry approach to facilitate safety, reliability and economic efficiency in nuclear power plant operations. As an advisory organization to the nuclear power industry, the NEI has recommended that nuclear power plant operators implement and document the "baseline" cyber security controls described in Section 3.1.6 of the document entitled "NEI 08-09 Revision 6 Cyber Security Plan for Nuclear Power Reactors" promulgated by the NEI (hereinafter, "NEI-08-09"), and implement and document a cyber security program to maintain the established cyber security controls through a comprehensive life cycle approach as described in Section 4 of NEI 08-09.

NEI 08-09 Section 4 establishes the programmatic elements recommended to maintain cyber security throughout the life cycle of Critical Digital Assets (CDAs). The elements of NEI 08-09 Section 4 are intended to provide high assurance that CDAs associated with the SSEP functions are adequately protected from cyber attacks up to and including the DBT. A life cycle approach is recommended by the NEI consistent with the controls described in Appendix E of NEI 08-09, Revision 6. This approach is intended to ensure that the cyber security controls established and implemented for CDAs are maintained to achieve a nuclear plant's overall cyber security program objectives.

NEI 08-09 addresses not only the security of existing digital assets, but also the security of proposed new digital assets, or existing digital assets that are undergoing modification.

Accordingly, nuclear power plant operators have been charged with the task of identifying those systems in their nuclear power plants that relate to SSEP functions, identifying components of those systems that are digital assets, identifying which of those assets are Critical Digital Assets, establishing appropriate cyber security controls for each of the CDAs, implementing the established cyber security controls, and documenting that the established cyber security controls have been implemented, both for existing and new or upgraded components.

These tasks are non-trivial, and can only be completed in a majority of cases during periods when the nuclear power plants are off-line, which usually occurs only for scheduled maintenance. Furthermore, the NRC has granted nuclear power plant operators a limited amount of time to implement the required security controls. Thus, nuclear power plant operators are currently faced with a serious, but necessary, burden to implement the requirements of the NRC with regard to existing equipment in a timely manner.

In addition, nuclear power plant operators will be faced with a continuing burden to ensure that new and/or upgraded equipment is appropriately screened to determine if it is or has become a CDA, and to take appropriate steps to identify and implement appropriate cyber security controls for such new and/or upgraded equipment.

SUMMARY

Some embodiments of the present invention provide systems and/or methods that implement a coordinated cyber security program for a power generation plant to establish and/or maintain cyber security controls for the power generation plant through a comprehensive life cycle approach.

DESCRIPTION OF EMBODIMENTS

Figure 1:
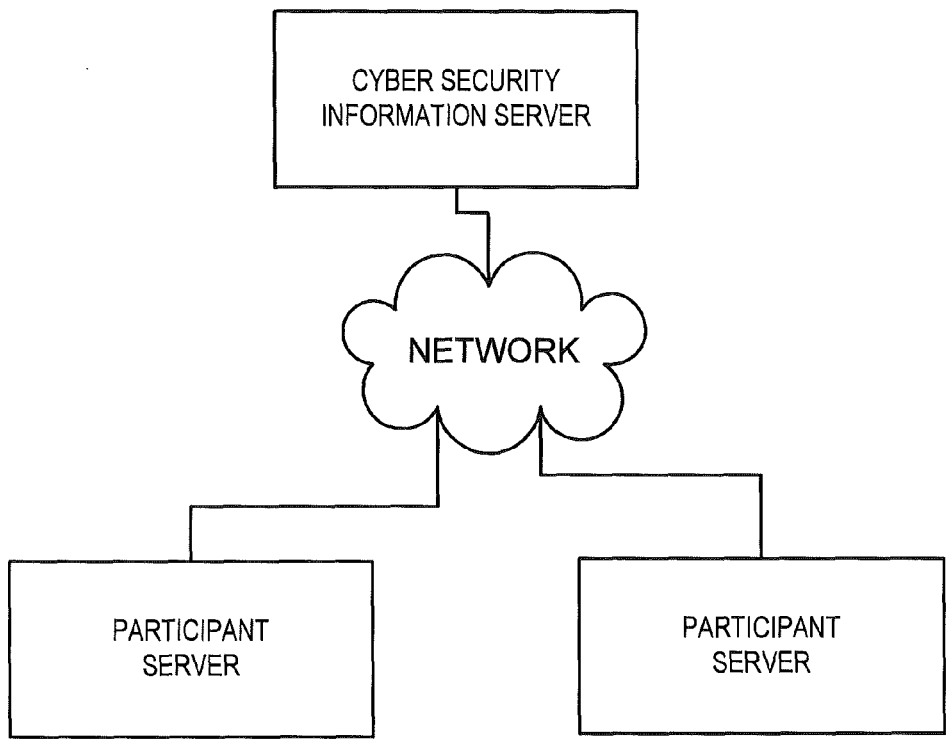
FIG. 1 illustrates systems and/or components according to some embodiments of the invention.

Some embodiments of the present invention provide systems and/or methods that implement a coordinated cyber security program for a power generation plant to establish and/or maintain cyber security controls for the power generation plant through a comprehensive life cycle approach. Although described below in the context of a nuclear power plant, it will be appreciated that embodiments of the invention can be employed to implement a coordinated cyber security program and/or to establish and/or maintain cyber security controls for the digital assets in fossil fuel based power generation plants and/or any other type of facility, whether or not dedicated to power generation, that has a need to implement cyber security controls.

In particular, some embodiments take advantage of the fact that many nuclear power plants, particularly in the United States, have similar designs, and that many of the components used in those reactors are similar and/or were manufactured by a limited number of suppliers to the nuclear power industry. Accordingly, some embodiments provide systems and/or methods that collect, synthesize and distribute information to nuclear power plant operators regarding components of systems that relate to SSEP functions, which assets used in those systems are critical digital assets, and what cyber security controls are identified for particular CDAs.

In some embodiments, compliance with nuclear power plant cyber security requirements is enhanced by a cyber security information server that communicates with cooperating servers managed by a plurality of participating power plant operators. The cyber security information server includes a master cyber security repository that stores information related to digital assets. In particular, the master cyber security repository stores encrypted information relating to digital assets that have been identified as critical digital assets by one or more of the participating operators, as well as information concerning the cyber security controls that have been identified for the critical digital assets.

A server of a participating operator may upload information relating to critical digital assets and related cyber security controls that have been identified by the operator to the cyber security information server over a secure communication link. The uploaded information may then be integrated by the cyber security information server into the master cyber security repository. In particular, the uploaded information may be compared with existing information about the identified critical digital assets, and records in the cyber security information server may be updated in response to the information provided by the operator. Moreover, information in a local cyber security repository of the participating operator may be updated using information stored in the master cyber security repository, so that the participating operator's local cyber security repository can be maintained as current as possible. In either case, a revision control mechanism may be employed to ensure data integrity.

As additional operators contribute information, the master cyber security repository is updated with more information about different kinds of assets, including information about different models, different engineering change levels, different manufacturers, etc., for the CDAs. Moreover, the systems/methods can automatically update the local cyber security repositories of participating operators. Participating operators can thereby have some assurance that their identifications of digital assets and related cyber security controls are consistent with those of other industry members.

Furthermore, because many nuclear power plant operators use similar equipment from a limited number of manufacturers, systems/methods according to embodiments of the invention have the potential to save a significant amount of resources at the operators, as the previous identifications of critical digital assets and related cyber security controls can be shared among participating operators.

Some further embodiments provide an integrated system for performing a baseline assessment of digital assets in a nuclear power plant, supporting life cycle compliance with cyber security requirements, and providing cyber security reporting resources to a nuclear power plant operator. The integrated system may utilize information stored in the local cyber security repository to assist with these functions.

An information server for managing cyber security information for power generation facilities, includes a master cyber security repository configured to store security control information for digital assets associated with a plurality of power generation facilities, a network interface configured to communicate with one or more participant servers operated on behalf of the power generation facilities over a data communication network, and a repository manager module configured to manage the security control information in the master cyber security repository.

The repository manager module is configured to receive security information for a first digital asset from a first one of the participant servers, to determine if a record for the first digital asset exists in the master cyber security repository, and, in response to determining that a record exists for the first digital asset, to update the record of the first digital asset with the security information.

The repository manager module is configured, in response to determining that the record exists for the first digital asset, to determine if the record of the first digital asset needs to be updated before updating the record of the first digital asset with the security information.

The repository manager module is configured, in response to determining that the record does not exist for the first digital asset, to create a new record for the first digital asset and to update the new record with the security information.

The repository manager is further configured to transmit the updated record of the first digital asset to a second one of the participant servers.

The first participant server and the second participant server may be operated by independent power generation entities.

The digital asset includes an equipment used in digital computer and/or communications systems and/or networks in a power generation facility that performs a safety-related or important-to safety function, a security function, or an emergency preparedness function, or the asset supports systems and equipment which, if compromised, would adversely impact the safety, security, or emergency preparedness functions.

A participant server for managing digital assets in a power generation facility includes a local cyber security repository configured to store security control information for digital assets used within the power generation facility, a network interface configured to communicate with a remote cyber security information server over a data communication network, and a cyber security reporting module configured to conform security information in the local cyber security repository with security control information in a master cyber security repository operated by the remote cyber security information server.

The cyber security reporting module is configured to transmit security information for one or more digital assets used within the power generation facility to the remote cyber security information server and to update security information in the local cyber security repository with security control information received from the remote cyber security information server.

The participant server further includes a life cycle compliance module that is configured to integrate security information for digital assets used within the power generation facility contained in the local cyber security repository with an internal process relating to the digital assets.

The life cycle compliance module is configured to integrate security information for digital assets used within the power generation facility contained in the local cyber security repository with an engineering change process for updating the digital assets.

The life cycle compliance module is configured to interface with an enterprise asset management system operated by the power generation facility.

A method of managing cyber security information for power generation facilities includes storing security control information for digital assets associated with a plurality of power generation facilities, receiving security information for a first digital asset from a first remote participant server, determining if a record for the first digital asset exists in a master cyber security repository, and in response to determining that a record exists for the first digital asset, updating the record of the first digital asset with the security information.

The method further includes transmitting the updated record of the first digital asset to a second remote participant server.

The method further includes, in response to determining that the record exists for the first digital asset, determining if the record of the first digital asset needs to be updated before updating the record of the first digital asset with the security information.

The method further includes, further including, in response to determining that the record does not exist for the first digital asset, creating a new record for the first digital asset and updating the new record with the security information.

FIG. 1 illustrates systems and/or components according to some embodiments of the invention. As shown therein, a cyber security information server communicates with a plurality of participant servers managed by a plurality of participating nuclear power plant operators over a data communications network. The network may be a public data communications network, such as the Internet, or a private data communications network. In either case, communications between the cyber security information server and the participant servers may be conducted using encrypted communications to reduce the chance of unauthorized interception of the communications. In some embodiments, a secure virtual private network (VPN) may be established over a public communications network, and communications between the cyber security information server and the participant servers may be conducted over the VPN.

Figure 2:
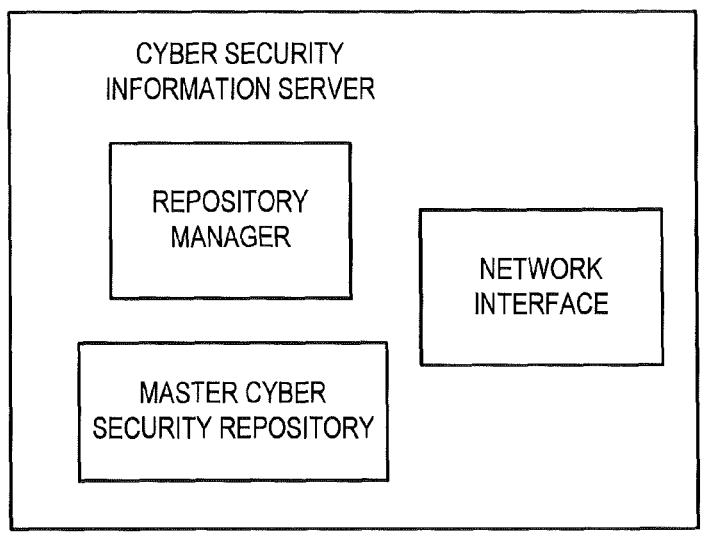
FIG. 2 illustrates components of a cyber security information server according to some embodiments.

Referring to FIG. 2, the cyber security information server includes a master cyber security repository that stores encrypted information related to digital assets, and a repository manager that manages information stored in the master cyber security repository. In particular, the master cyber security repository stores information relating to digital assets that have been identified as critical digital assets by one or more of the participating operators, as well as information concerning the cyber security controls that have been identified for the critical digital assets.

Figure 3:
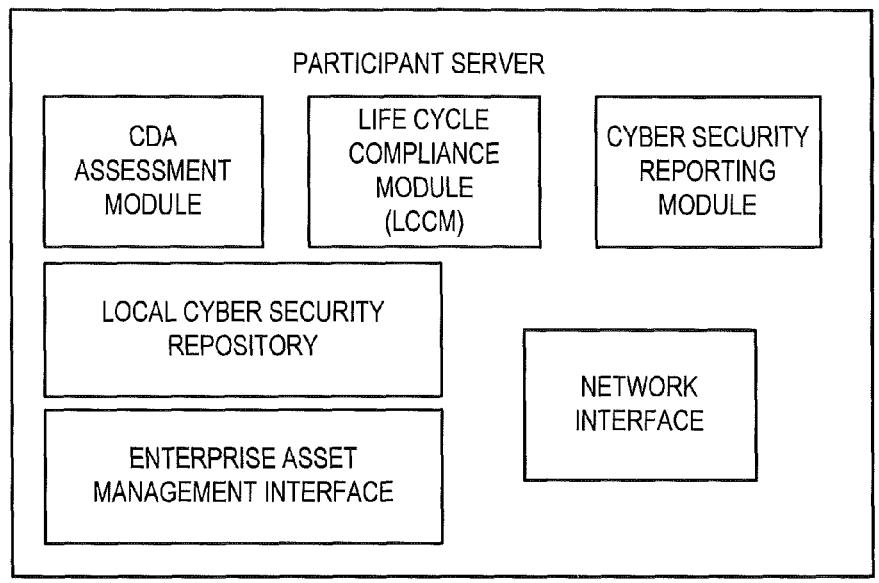
FIG. 3 illustrates components of a participant server according to some embodiments.

FIG. 3 illustrates components of a participant server in more detail. As shown therein, the participant server includes a CDA assessment module, a life cycle compliance module (LCCM) and a cyber security reporting module. Each of these modules has access to a local cyber security repository which stores encrypted information relating to CDAs and associated security controls for equipment belonging to the owner of the participant server. The local cyber security repository may also store information concerning systems of the operator that have been identified as critical systems that perform SSEP functions to assist in life cycle management, as discussed in more detail below. The participant server also includes an enterprise asset management (EAM) interface that is configured to interface with an existing EAM system of the participating operator.

As will be appreciated, critical digital assets can include any physical assets may include any equipment used in digital computer and communications systems and networks in a nuclear power plant. Once a digital asset has been identified and it is determined that the digital asset performs a safety-related or important-to safety function, a security function, or an emergency preparedness function, or the asset supports systems and equipment which, if compromised, would adversely impact the safety, security, or emergency preparedness functions (the "SSEP functions"), it is then determined if the asset constitutes a critical digital asset (CDA) for which security controls must be (a) identified and (b) implemented.

Accordingly, CDAs can include any equipment that generates, stores, transmits or processes digital information. Computer equipment, network equipment, electronic control equipment, telemetry equipment, security cameras, databases and the like can therefore all potentially be considered CDAs, depending on their function and/or implementation in a nuclear power plant. In addition, given the increasing trend toward digitization of equipment, other types of equipment used in a nuclear power plant could also be considered a CDA, such as temperature sensors, pressure sensors, electronic valves, turbines, power meters, pumps, and many other types of equipment could potentially be identifies as a CDA.

The kinds of security controls that may be required for a particular CDA may depend, for example, on the type of equipment in question, whether the equipment is programmable or non-programmable, whether the equipment is capable of wired and/or wireless communication, whether the equipment has any digital input/output ports, whether the equipment stores information, whether the equipment can be remotely controlled, and/or many other factors. Accordingly, each CDA may be subject to a number of different controls. Moreover, different operators may identify different controls for the same piece of equipment.

After a participating operator has identified a particular piece of equipment as being a CDA and determined what the appropriate security controls for that CDA are, that information is loaded into the local cyber security repository of the participant server. The participant server may then upload that information over the secure communication link to the cyber security information server.

The uploaded information may then be integrated by the cyber security information server into the master cyber security repository.

Figure 4:
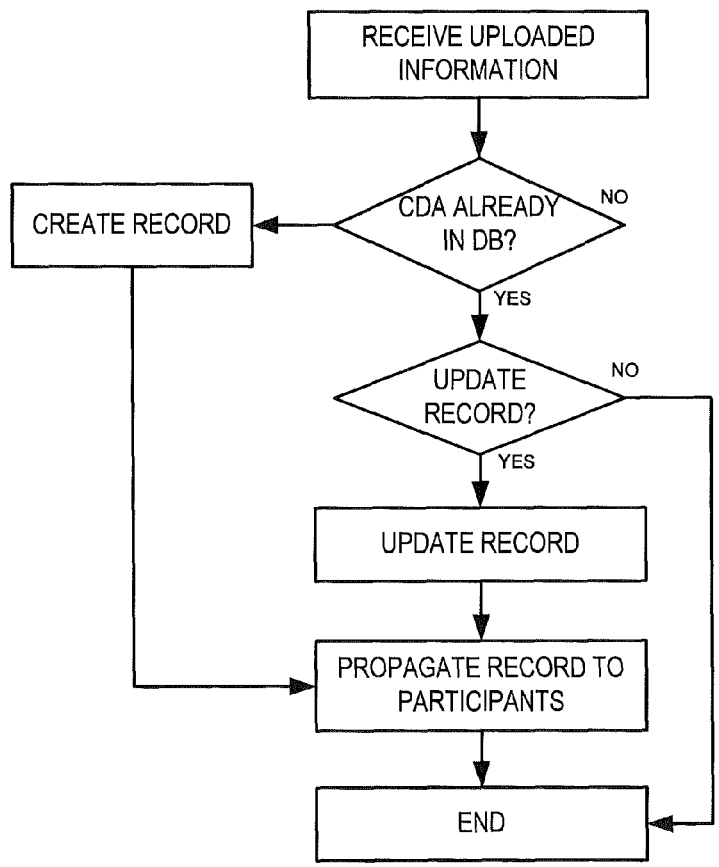
FIGS. 4-7 are flowcharts illustrating systems/methods according to some embodiments.

For example, the uploaded information may be compared with existing information about the identified critical digital assets, and records in the cyber security information server may be updated in response to the information provided by the operator. In some cases, a new revision of the information will be created. Referring to FIG. 4, the repository manager of the cyber security information server may compare the uploaded CDA and security control information and determine if the master cyber security repository already contains a record for the equipment in question. If not, the repository manager may create a new record or revision and store the information in the master cyber security repository. Otherwise, the repository manager determines if the existing record should be updated. For example, the uploaded information may identify a new security control for the CDA and/or new conditions or criteria for an existing security control for the CDA. In that case, the record in the master cyber security repository is updated.

Information in a local cyber security repository of the participating operators may be updated using information stored in the master cyber security repository, so that the participating operator's local cyber security repository can be maintained as current as possible. For example, in response to creating a new record/revision or updating a record in the master cyber security repository, the new or updated record may be propagated to all of the local cyber security repositories at the participant servers.

Baseline Analysis

Baseline analysis involves identifying all existing CDAs and determining appropriate security controls for the identified CDAs. Baseline analysis may be managed by the CDA assessment module of the participant server.

Life Cycle Management

Once a licensee has implemented and documented the baseline Critical Digital Asset (CDA) cyber security controls described in NEI 08-09, they are required to establish a cyber security program whose purpose is to maintain the established cyber security controls throughout the lifecycle of the CDA or the decommissioning of the plant. According to some embodiments, a Life Cycle Compliance Module (LCCM) operating at a participant server may be configured to provide automation support for the definition and execution of processes (including both revising existing processes and the potential creation of new processes) that will maintain high assurance that CDAs associated with the SSEP (i.e. Safety, Security, Emergency Preparedness or supporting systems) functions are adequately protected from cyber attacks up to and including the Design Basis Threats.

In particular, the LCCM may provide automation support for closing identified gaps in existing processes as well as integrating with the Enterprise Asset Management (EAM) system currently used to support the existing process.

Figure 5:
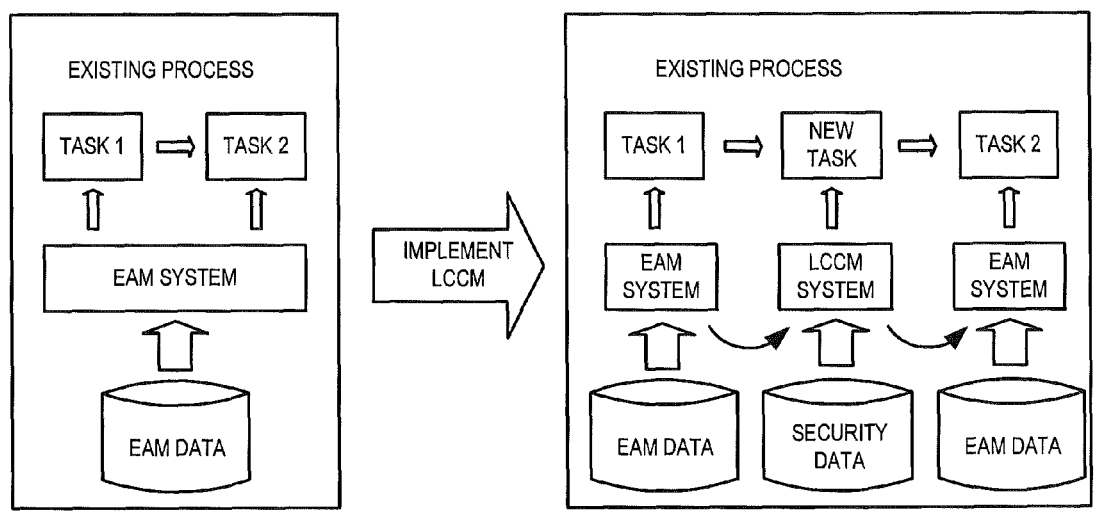

For example, referring to FIG. 5, a nuclear plant operator may currently execute a process that impacts one or more CDAs within an SSEP system. The current process, which does not meet the regulatory requirements, may be composed of two tasks (Task 1 and Task 2), each of which is supported by data and business logic residing in the Utility's EAM system.

With coordination provided by the LCCM, the plant operator will implement a new version of the process, wherein those tasks that previously existed and were supported by the EAM remain, but are augmented by new tasks which are supported by the LCCM. In addition to providing the requisite cyber security functionality, the LCCM can also maintain an integration to/from the operator's EAM system through the EAM interface shown in FIG. 3 in order to ensure data integrity. Security-specific data (i.e. data that could be used to construct target sets) may be stored separately within the LCCM application.

Configuration Management

For existing CDAs (i.e. those that were analyzed during the baseline assessment), NEI 08-09 recommends a life cycle approach that ensures that the cyber security controls established and implemented are maintained throughout the life of the CDA to achieve the site's overall cyber security program objectives. This includes:

Creating and maintaining a Baseline Configuration

Establishing a Configuration Change Control

Performing Security Impact Analysis; and

Maintaining a Component Inventory for CDAs

These requirements may require changes to existing processes, such as Engineering Change, Work Management, Tagout, and others. It is assumed that the extensions to these processes and the requisite computer automation are outside the scope of the plant's EAM system. The LCCM can fill the gap in terms of extending the processes affected, providing the requisite cyber security automation, and maintaining an integration with the EAM to facilitate a seamless flow of data across the processes.

Engineering Change Example

The Engineering Change (EC) process is a representative example of the degree and manner in which an existing process will be impacted by the implementation of the Cyber Security Plan's Configuration Management requirements. While the detailed implementation and terminology of the EC process may differ from site to site, the core process described below is essentially followed throughout the nuclear power generation industry. The EC process can be decomposed into the following sub-processes:

A. Request Engineering Change

The Request Engineering Change process may be used to define the concept of an engineering change and to determine whether or not the change is necessary. An approved Engineering Change Request (ECR) may be converted into an Engineering Change (EC) or may result in initiation of other engineering tasks. These other tasks may be initiated using an Action Request, Procurement Engineering Request, or other means.

B. Define Engineering Change

The Define Engineering Change process may be initiated by ECR, an Action Request (AR) assignment, or directly by a user on the EAM's Engineering Change (EC) panel. The process includes the steps necessary to describe a permanent or temporary plant modification or a design change only.

C. Approve Engineering Change

The Approve Engineering Change process begins once an EC has been defined and is ready for review and approval. The process includes the steps necessary to route the EC to the requisite approvers and to resolve any comments made by the approvers during their review.

Accordingly, changes to the above sub-processes may be required in order for the existing Engineering Change process to become conformant with the regulatory requirements.

Revision to Define EC Sub-Process

Figure 6:
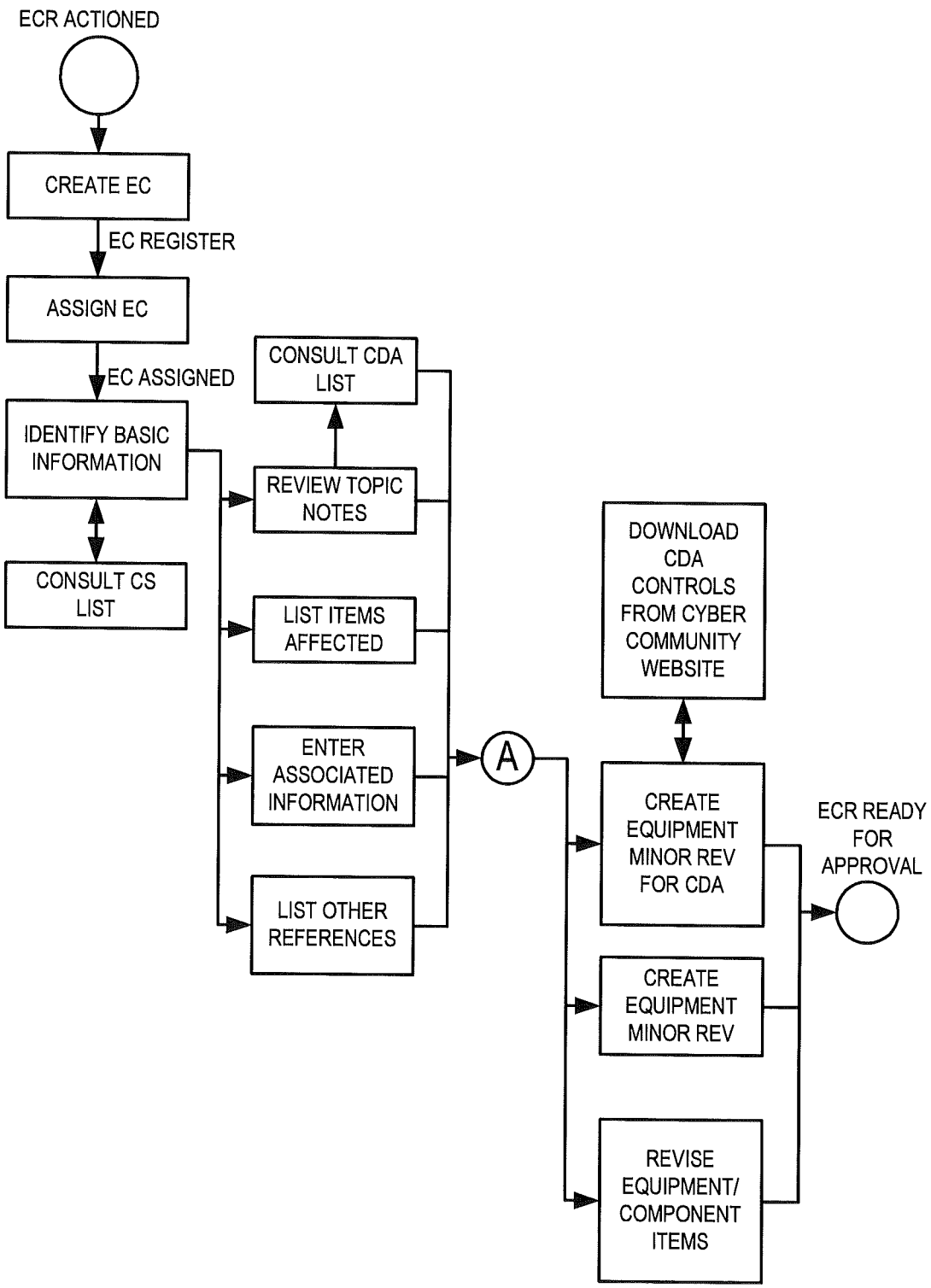

Changes to the Define EC sub-process are illustrated in FIG. 6.

1. Create EC

Engineering Management (EM) reviews any proposed Engineering Change (EC) to determine whether the EC is needed. If needed, EM (or designee) enters data into the required fields (i.e., Facility, EC Type and Title) in the EAM system. Other information may be required based on the Facility and EC Type/Sub-type. Once the required data has been entered, the EAM system assigns an EC number and sets the EC status to REGISTER.

2. Assign EC

EM assigns a lead person to the EC and enters their ID in the Responsible Engineer (RE) field in the EAM system. EM also assigns an Alert Group that will receive notification messages during the processing of the EC. EM then changes the status of the EC to ASSIGNED.

3. Identify Basic Information

The assigned RE enters the applicable basic information pertaining to the EC, including the affected Unit and System into the EAM system. The RE also identifies whether:

The EC is a permanent, temporary or master EC.

The work to be performed will be done during an outage.

A work order is required before the EC can advance to ACTIVE status.

Work can begin prior to approval of the EC.

The EC can automatically advance through its life cycle once all requirements have been met to advance to ACTIVE status.

Documents can be automatically as-built.

It may then be determined whether the affected system performs an SSEP function by cross-referencing the system against the Critical System list in the local cyber security module.

Other information may be added, including the priority of the EC, when approval is required and when affected equipment is estimated to return to service.

4. Review Topic Notes & Attributes

The RE reviews notes topics for applicability and adds or deletes topics as appropriate. Topic Notes typically include installation instructions, review comments, scope, or other topics defined by the client. The topics may be defined by the client. The overall change and any interface assessments (e.g., Fire Protection, Safety Analysis, etc.) can also be documented here. If the system perform's an SSEP function, the RE will review the topic note(s) relating to changes impacting an SSEP system.

The RE also reviews the default attributes for applicability and adds or deletes attributes as necessary. Attributes normally capture any applicable assessments. Data for the attributes is then entered, as appropriate.

5. List Affected Items

The RE lists the various documents, including procedures, drawings and specifications, affected by the change on the EC Affected Document List in the EAM system. The RE sets a flag for those documents needed to be updated and issued prior to equipment return to service.

The RE also lists any equipment/component items affected by the change on the EC Affected Equipment List in the EAM system, as well as any catalog items or bills of material affected by the change on the Affected Catalog/BOM List.

If the affected system performs an SSEP function, the RE may cross-reference all equipment affected by the change against the CDA list in the LCCM.

6. Enter Associated Information

The RE may enter other information, such as accounting data, and additional non-EAM references on the EC Additional Details panel in the EAM system. EC planning and scheduling data may be entered on the EC Planning/Scheduling panel, and milestones entered on the EC Milestones panel in the EAM system.

7. List Other References

The RE lists any other EAM objects related to the change on the EAM Cross References panel. New references may also be created. A reference may constrain the EC from being closed until it is completed, or a reference may be constrained from being activated until the EC is approved. These constraints are set by checking the appropriate field for each reference. The RE also lists any other documents related to the EC that may be necessary to understand or substantiate the change on the Document References panel in the EAM system.

8. Create Equipment Minor Revision

The RE creates a minor revision for each affected equipment/component item in the EAM system and uses the revision to show the change required by the EC.

The minor revision is then created in the EAM database with a status of PENDING. If a new equipment item is required by the EC, the RE navigates to the EAM's master equipment panel, and enters the requisite data.

9. Create Equipment Minor Revision for CDA

If the affected system performs an SSEP function, and the affected equipment/component item is a CDA, then the RE may consult the local cyber security repository to determine whether the change impacts any of the cyber security controls applied against the item. The RE then creates a minor revision for each affected equipment/component item in the EAM system and uses the revision to show the change required by the EC.

The minor revision is then created in the EAM database with a status on PENDING. If a new equipment item is required by the EC, the RE navigates to the EAM's master equipment panel, and enters the requisite data. If the new equipment is a digital asset, the RE may consult the participant cyber security information server and:

Search for the digital equipment in question
  If found, download the cyber security controls data to the local cyber security repository; and
  Notify the Cyber Security Analysis Team (CSAT) that a new CDA is available for analysis and review 10. Revise Equipment/Component Items The RE makes the changes required by the EC to the affected equipment/component items in the EAM system. The State field may be used to denote whether the item is being added deleted or modified.

Revision to Approve EC Sub-Process

Figure 7:
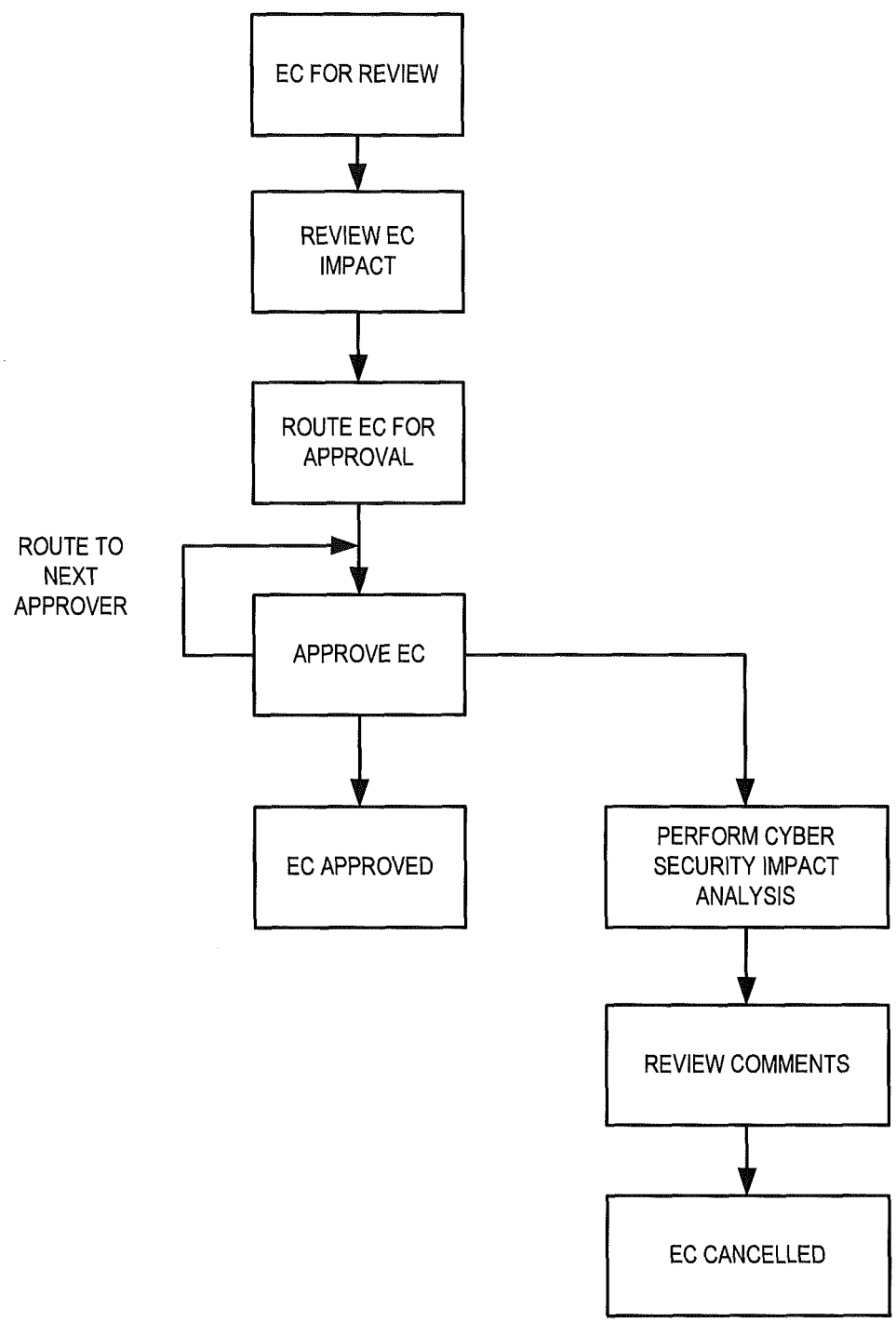

Referring to FIG. 7, changes to the Define EC sub-process are illustrated.

1. Review EC Impact

The RE reviews the changes defined for the affected equipment/component items. When satisfied, The RE sets a flag on each affected line item in the EAM system.

2. Route EC for Approval

To route the EC, the RE first selects the appropriate Route List in the EAM system. If the affected system performs an SSEP function, the RE ensures that the Cyber Security Analysis Team (CSAT) is included in the route list. Individual approvers or Alert Groups may also be entered by the RE. The RE should be listed as the last approver for further processing of the approved EC. After determining the routing, the RE submits the Route List and the EAM system automatically sends, in series, a message to each approver.

3. Approve EC

The designated approvers receive, in series, a message to approve the EC. Each approver selects the message to navigate to the EAM's approval panel. The approver reviews the EC information and may:

Approve the EC and record comments (or record "No comment").
Reject the EC with comments requiring resolution.

4. Perform Cyber Security Impact Analysis

The CSAT approver(s) will perform a cyber security impact analysis for each equipment/component item in the EC that forms part of a system that performs an SSEP function and is a digital asset. The CSAT approver uses the LCCM to perform the analysis, reviewing all applicable controls in a manner similar to the Baseline Assessment Analysis process. The CSAT approver may:

Approve the EC and record comments (or record "No comment").
Reject the EC with comments requiring resolution, specifically the actions required to bring the EC into cyber security conformance.

5. Resolve Comments

The RE receives a message when an EC is rejected. The RE accesses and resolves the approver's comments and incorporates appropriate comments into the EC.

Systems and Services Acquisition

For proposed new digital assets, or existing digital assets that are undergoing modification, the process described in Sections 10 and 11 of the Operational and Management controls of NEI 08-09, Revision 6, Appendix E must be implemented. This will require changes to supply chain processes such as Procurement Engineering. The LCCM can provide the basis for extending the affected processes and the requisite support whenever the extension falls outside the scope of the EAM system.

Cyber Security Reporting

Operators may be required to produce documentation verifying the implementation of an acceptable cyber security plan. The cyber security reporting module illustrated in FIG. 3 may manage the generation of reports from the local cyber security repository to satisfy this requirement.

Embodiments of the present invention have been described with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, some embodiments of the present invention may be embodied as a method, data processing system, and/or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments of the present invention are described herein with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer processor or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the present invention may be written in an object oriented programming language, such as Java® or C++. However, the computer program code for carrying out operations of the present invention may also be written in conventional procedural programming languages, such as the C programming language. The program code may execute entirely on the user's computer, partly on the user's computer, as a stand alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. An information server for managing cyber security information for power generation facilities, comprising:
   a processor;
   a master cyber security repository configured to store security control information for digital assets associated with a plurality of power generation facilities;
   a network interface configured to communicate with one or more participant servers operated on behalf of the power generation facilities over a data communication network wherein the participant servers manage the security control information for the digital assets; and
   a memory comprising a repository manager module configured to manage the security control information in the master cyber security repository;

wherein the repository manager module is configured to receive security information for a first digital asset from a first one of the participant servers associated with a first one of the plurality of power generation facilities, to determine if a record for the first digital asset exists in the master cyber security repository, and, in response to determining that a record exists for the first digital asset, to update the record of the first digital asset with the security information; and wherein the information server is configured to transmit the updated record of the first digital asset to a second one of the participant servers associated with a second one of the plurality of power generation facilities for use in connection with a second digital asset;

wherein the first participant server and the second participant server are operated by independent power generation entities; and wherein the repository manager module is configured, in response to determining that the record exists for the first digital asset, to determine if the record of the first digital asset needs to be updated before updating the record of the first digital asset with the security information.

2. The information server of claim 1, wherein the digital asset comprises an equipment used in digital computer and/or communications systems and/or networks in a power generation facility.

3. The information server of claim 2, wherein the digital asset performs a safety-related or important-to safety function, a security function, or an emergency preparedness function, or the asset supports systems and equipment which, if compromised, would adversely impact the safety, security, or emergency preparedness functions.

4. An information server for managing cyber security information for power generation facilities, comprising:
a processor;
a master cyber security repository configured to store security control information for digital assets associated with a plurality of power generation facilities;
a network interface configured to communicate with one or more participant servers operated on behalf of the power generation facilities over a data communication network wherein the participant servers manage the security control information for the digital assets; and
a memory comprising a repository manager module configured to manage the security control information in the master cyber security repository;
wherein the repository manager module is configured to receive security information for a first digital asset from a first one of the participant servers associated with a first one of the plurality of power generation facilities, to determine if a record for the first digital asset exists in the master cyber security repository, and, in response to determining that a record exists for the first digital asset, to update the record of the first digital asset with the security information; and
wherein the information server is configured to transmit the updated record of the first digital asset to a second one of the participant servers associated with a second one of the plurality of power generation facilities for use in connection with a second digital asset;
wherein the first participant server and the second participant server are operated by independent power generation entities; and
wherein the repository manager module is configured, in response to determining that the record does not exist for the first digital asset, to create a new record for the first digital asset and to update the new record with the security information.

5. A participant server for managing digital assets in a power generation facility, comprising:
a processor;
a local cyber security repository configured to store security control information for digital assets used within the power generation facility;
a network interface configured to communicate with a remote cyber security information server over a data communication network; and
a memory comprising a cyber security reporting module configured to conform security information in the local cyber security repository with security control information in a master cyber security repository operated by the remote cyber security information server;
wherein the cyber security reporting module is configured to transmit security information for one or more digital assets used within the power generation facility to the remote cyber security information server; and
wherein the local cyber security repository is configured to receive updated security control information for the one or more digital assets from the remote cyber security information server and to update security information in the local cyber security repository with the updated security control information received from the remote cyber security information server;
wherein the participant server further comprises a life cycle compliance module that is configured to integrate security information for digital assets used within the power generation facility contained in the local cyber security repository with an internal process relating to the digital assets.

6. The participant server of claim 5, wherein the life cycle compliance module that is configured to integrate security information for digital assets used within the power generation facility contained in the local cyber security repository with an engineering change process for updating the digital assets.

7. The participant server of claim 5, wherein the life cycle compliance module is configured to interface with an enterprise asset management system operated by the power generation facility.

8. A method of managing cyber security information for power generation facilities, comprising:
storing security control information for digital assets associated with a plurality of power generation facilities at an information server comprising a processor;
receiving, at the information server, security information for a first digital asset from a first remote participant server associated with a first one of the plurality of power generation facilities;
determining, at the information server, if a record for the first digital asset exists in a master cyber security repository;
in response to determining that a record exists for the first digital asset, updating, at the information server, the record of the first digital asset with the security information; and
transmitting the updated record of the first digital asset from the information server to a second remote participant server associated with a second one of the plurality of power generation facilities for use in connection with a second digital asset managed by the second remote participant server;

wherein the first participant server and the second participant server are operated by independent power generation entities;

wherein the method further comprises, in response to determining that the record exists for the first digital asset, determining if the record of the first digital asset needs to be updated before updating the record of the first digital asset with the security information.

9. The method of claim 8, wherein the digital asset comprises an equipment used in digital computer and/or communications systems and/or networks in a power generation facility.

10. The method of claim 8, wherein the digital asset performs a safety-related or important-to safety function, a security function, or an emergency preparedness function, or the asset supports systems and equipment which, if compromised, would adversely impact the safety, security, or emergency preparedness functions.

11. The method of claim 8, farther comprising, in response to determining that the record exists for the first digital asset, determining if the record of the first digital asset needs to be updated before updating the record of the first digital asset with the security information.

12. The method of claim 8, further comprising, in response to determining that the record does not exist for the first digital asset, creating a new record for the first digital asset and updating the new record with the security information.

* * * * *